(12) United States Patent
Sakaguchi et al.

(10) Patent No.: US 9,068,857 B2
(45) Date of Patent: Jun. 30, 2015

(54) NAVIGATION APPARATUS

(71) Applicant: DENSO CORPORATION, Kariya, Aichi-pref. (JP)

(72) Inventors: Natsuko Sakaguchi, Kariya (JP); Seiji Kato, Toyota (JP)

(73) Assignee: DENSO CORPORATION, Kariya (JP)

( * ) Notice: Subject to any disclaimer, the term of this patent is extended or adjusted under 35 U.S.C. 154(b) by 37 days.

(21) Appl. No.: 13/672,003

(22) Filed: Nov. 8, 2012

(65) Prior Publication Data

US 2013/0138345 A1    May 30, 2013

(30) Foreign Application Priority Data

Nov. 28, 2011    (JP) .................................. 2011-259281

(51) Int. Cl.
  *G01C 21/00*   (2006.01)
  *G08G 1/123*   (2006.01)
  *G01C 21/36*   (2006.01)

(52) U.S. Cl.
  CPC .................................. *G01C 21/3626* (2013.01)

(58) Field of Classification Search
  CPC ...... G01C 21/00; G01C 21/26; G01C 21/005;
       G01C 21/28; G01C 21/30; G01C 21/32;
       G01C 21/34; G01C 21/3407; G01C 21/3415;
       G01C 21/3423; G01C 21/343; G01C 21/3453;
       G01C 21/3446
  USPC ............................ 701/400–541; 340/988–996
  See application file for complete search history.

(56) References Cited

U.S. PATENT DOCUMENTS

| 2005/0043884 A1* | 2/2005 | Atarashi .................... 701/202 |
| 2012/0197525 A1 | 8/2012 | Noro et al. |
| 2012/0232789 A1 | 9/2012 | Nakamura |

FOREIGN PATENT DOCUMENTS

| JP | A-06-088733 | | 3/1994 |
| JP | 2005-172578 | * | 6/2005 |
| JP | 2005-172578 | A | 6/2005 |
| JP | A-2006-125883 | | 5/2006 |
| JP | 2013-092458 | A | 5/2013 |

OTHER PUBLICATIONS

Office action mailed Oct. 1, 2013 in the corresponding JP application No. 2011-259281 (English translation).
U.S. Appl. No. 13/537,505, filed Jun. 29, 2012, Tsutsumi et al.

* cited by examiner

*Primary Examiner* — Muhammad Shafi
(74) *Attorney, Agent, or Firm* — Posz Law Group, PLC (57) ABSTRACT

A navigation apparatus includes an exit route determine unit and a route guidance unit. The exit route determination unit determines whether an exit route of a route guidance from a branch point corresponds to a learned road link. The route guidance unit provides route guidance by presenting a progress direction toward the exit route from the branch point in a first mode or a second mode. Per the first mode, the progress direction is based on an existing road link, and per the second mode, the progress direction is based on the existing road link and the learned road link. Accordingly, the route guidance unit presents the progress direction in: (i) the first mode when the exit route from the branch point does not correspond to the learned road link, and (ii) the second mode, when the exit route from the branch point corresponds to the learned road link.

13 Claims, 9 Drawing Sheets

NAVIGATION APPARATUS

CROSS REFERENCE TO RELATED APPLICATION

The present application is based on and claims the benefit of priority of Japanese Patent Application No. 2011-259281, filed on Nov. 28, 2011, the disclosure of which is incorporated herein by reference.

TECHNICAL FIELD

The present disclosure generally relates to a navigation apparatus performing route guidance based on map data and road data that is acquired and learned through travel experiences of the vehicle.

BACKGROUND

Based on a movement of a movable object, such as a vehicle, a navigation apparatus may learn of a new road, which is not registered in a ready-made map data. Such a navigation apparatus is conventionally disclosed in, for example, Japanese Patent Laid-Open No. H06-88733 (JP '733) and Japanese Patent Laid-Open No. 2006-125883 (JP '883). The road learning function is a function that learns a new road not registered in the map data, by generating a new road (i.e., a learned road) and storing it, based on a trace of the vehicle's movements from a point where a current vehicle position departed from an existing road of the map data to a point where the current vehicle position returned to the existing road.

When the learned road is used for route guidance, the learned road may be used for route guidance, depending on the reliability of the learned road. The examples of credibility problem are described in the following.

On way to a destination, the user may go to an intervening destination, such as a store, which is close to an intersection or a branch point of a road (e.g., a rotary, a junction, etc.). In such case, the ramp road (i.e., entrance) not on the road (i.e., not on the public road) may be counted or considered as part of the branch and may be stored as a learned road. The learned road may later be used as a guidance route by the navigation apparatus when the vehicle travels the road that passes the branch point or the branch point associated with the learned road, even though the learned road is not a public road. Therefore, the route guidance may be erroneous and problematic for such a branch point, since the actual road shape of such guidance point may not match the provided route guidance.

In other words, the progress direction shown by the route guidance at the branch is provided for the user as a connection direction of an exit route from the branch, which is to be traveled per the guidance route, and further as a relative positioning with other road(s) exiting from that branch.

For instance, if the guidance route at a branch is a right turn toward a right exit route and there is another right road exiting from the same branch, the two right roads from the same branch are respectively distinguished as a far-right road and a near-right road, for example, in the route guidance regarding the progress direction. That is, an absolute direction and the relative positioning of the roads are combined in the route guidance.

In case that the learned road connected to the branch is an actual public road, the route guidance at the branch in consideration of such learned road is not a problem, in terms of the progress direction shown by the route guidance. However, in case that the learned road is not a public road, which may be a ramp road into a facility site or an entrance road into a parking, the route guidance at the branch in consideration of such learned road is problematic, causing uncertainty in the route guidance because the route guidance and the branch shape may not be coinciding.

Therefore, for example, an exit route from a branch, which should be simply guided as "a right direction," may be misguided as "a near-right direction" in consideration of the learned road that is a ramp road existing in the right direction from the same branch.

In the prior art, distinction between learned road links and existing road links of the map data is not provided. Thus the reliability-considered route guidance based on the reliability of the learned road cannot be performed.

SUMMARY

In an aspect of the present disclosure, a navigation apparatus for use during a travel of a vehicle to provide route guidance utilizes ready-made map data and learned road data. The learned road data includes a learned road link, which is a road that is not included in the ready-made map data, where the learned road link is detected and acquired based on a trace of the vehicle's movement. The navigation apparatus includes an exit route determination unit and a route guidance unit.

When the learned road link in the learned road data is connected to a branch point that is an object of the route guidance, the exit route determination unit determines whether an exit route from the branch point by the route guidance corresponds to the learned road link. The route guidance unit provides a route guidance showing a progress direction of the exit route from the branch point in a first mode or a second mode.

Per the first mode, the route guidance unit depicts the progress direction of the exit route from the branch point in a manner that reflects or includes the existing road link of the ready-made map data. In particular, according to the first mode, only the existing road link is taken into consideration when presenting the progress direction, and not the learned road link. The first mode is provided when the exit route determination unit determines that the exit route from the branch point does not correspond to the learned road link.

Per the second mode, the route guidance unit depicts the progress direction of the exit route from the branch point in a manner that reflects the learned road link and the existing road link. Therefore, the second mode includes or considers both the existing road link and the learned road link when presenting the progress direction. The second mode is provided when the exit route determination unit determines that the exit route from the branch point corresponds to the learned road link.

In other words, the present disclosure provides a route guidance that reflects a shape of the branch including the existing road links only, without considering the learned road link in providing the progress direction from the branch point, when the learned road link connected to the branch point does not correspond to the exit route from such branch point (i.e., a next guidance route section after passing the branch point). In such manner, the learned road link, such as a ramp road into a site, an entrance road into a parking or the like, which may not be reliable, may not be included in the route guidance. On the other hand, if the exit route from the branch point corresponds to the learned road link, the route guidance reflects the shape of the branch including the learned road link and the existing link in the progress direction of the route guidance.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The embodiments of the present disclosure are described with reference to the drawings in the following. The following embodiments are illustrative and are not meant to limit the present disclosure in any way.

(Configuration of Navigation Apparatus)

Figure 1:
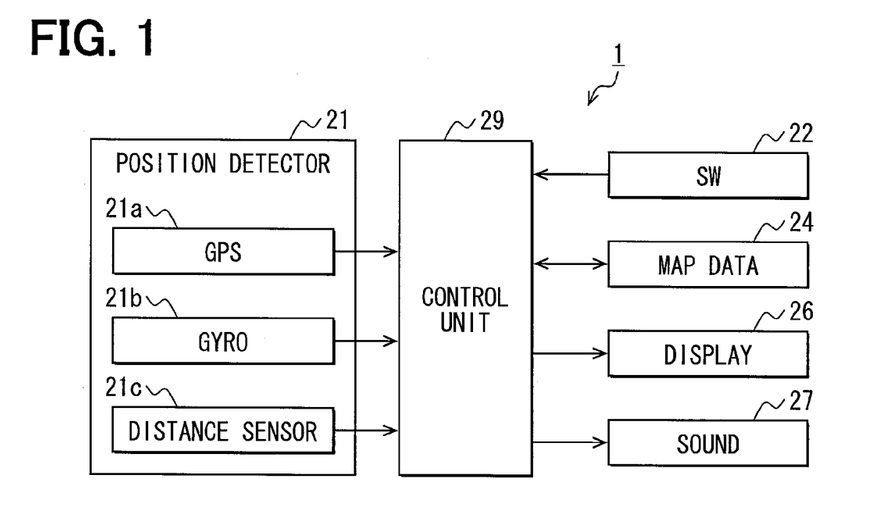
FIG. 1 is a block diagram of a navigation apparatus of the present disclosure.

A navigation apparatus 1 of the present embodiment is disposed in a vehicle. With reference to FIG. 1, the navigation apparatus 1 includes a position detector 21, an operation switch group 22 (SW in FIG. 1), a map data input unit 24 (map data in FIG. 1), a display unit 26 (display in FIG. 1), a sound output unit 27 (sound in FIG. 1), and a control unit 29. The map data input unit 24 receives data from a large capacity data medium for storing map data, programs, and the like. The display unit 26 displays various information and the sound output unit 27 outputs various sounds for guiding the user.

The position detector 21 detects a current position of the vehicle and includes a GPS receiver 21A, a gyroscope 21B, and a distance sensor 21C. The GPS receiver 21A receives GPS signals from satellites and detects a vehicle's position coordinates and altitude. The gyroscope 21B detects an angular velocity of a rotation motion of the vehicle and outputs a detection signal according to the detected motion. The distance sensor 21C outputs a travel distance of the vehicle. Based on the signals from the GPS receiver 21A, the gyroscope 21B, and the distance sensor 21C, the control unit 29 detects a current position, a direction, and a speed of the vehicle, together with measurements. Further, the calculation method for calculating the current position of the vehicle based on the output signal from the GPS receiver 21A may be implemented in various manners, such as a single point positioning method, a relative positioning method.

The operation switch group 22 receives instructions inputted by a user. The operation switch group 22 may include a touch panel integrally disposed on a screen of the display unit 26, a mechanical key positioned around the touch panel, and the like.

The map data input unit 24 is a device for inputting, to the control unit 29, data from a map data storage medium and/or a memory medium storing learned road data regarding a learned road acquired by a road learning function.

The map data storage medium stores the ready-made map data provided by a map data provider. The map data may be data including road data made up from links for connecting nodes and the nodes representing a point such as a branch point. In addition, the map data may include data used for drawing backgrounds as well as map matching data, route guidance data, operation programs for the operation of the navigation apparatus 1, design image data. Further, the ready-made map data may include an original map data and downloaded difference data that represents the difference, or an update, of the original map data.

The memory medium for storing the learned road data may be a memory device of electrically/magnetically rewritable nature, which will retain its memory even when the electric power supply is turned off, such as a hard disk, a flash memory. When a new road, which is non-existent among the pre-registered roads or already-learned roads, is detected by the road learning function of the navigation apparatus 1, the learned road data of the newly-detected road is stored to the memory medium.

The learned road data is information about road connection states regarding a node that is a connection point between the existing road and the learned road and a link connecting two nodes, and information about a shape of the links or the like. Further, as the learned road data, a total number of travels of a subject vehicle traveling each of the learned road links is stored in association with each of the links. A number of travels of a learned road link may be counted as the number of times a travel position of the subject vehicle passes a link.

The display unit 26 may be a color display unit having a liquid crystal display or the like as its display screen, and is capable of displaying various images according to the input of the video signal from the control unit 29. The display unit 26 is used for displaying guidance routes from a departure place to a destination, a current vehicle position mark, and other guidance information. The sound output unit 27 is configured to output voice guidance regarding various information to the user. The display unit 26 and the sound output unit 27 are used to display images and to output voices for providing the user with guidance, such as a direction.

The control unit 29 is implemented as a computer having a CPU, a ROM, a RAM, an input/output and a bus line connecting those components in combination with other parts, for controlling the above-described parts. The control unit 29 performs various kinds of process based on the program and data retrieved from the ROM and/or the map data input unit 24. The control unit 29 may serve as an exit route determination unit, a reliability determination unit, a positional relation determination unit and a route guidance unit in claims.

(Operation of Navigation Apparatus)

The processes performed by the control unit 29 are described in the following.

As for navigation-related processes, a map display process and a route guidance process are provided. In the map display process, the process calculates the current position of the subject vehicle based on a detection signal from the position detector 21. The process generates a map image based on the map data around the current position that is read from the map data input unit 24, and controls the display unit 26 to display a map image around the current position. Further, the control unit 29 puts, on top of a map image on the display unit 26, a current position mark of the subject vehicle which is detected by a detection signal from the position detector 21, and such mark of the current vehicle position may be moved or the map image may be scrolled according to the travel of the subject vehicle.

Further, in the route guidance process, upon having an input of a destination from the user, the control unit 29 performs an optimum route search for finding an optimum route to a destination from a departure place which is set as the current position of the vehicle, based on the road data retrieved from the map data input unit 24. Then, the searched optimum route serving as a guidance route is presented on top of the map image for the user from the display unit 26. The control unit 29 then outputs guidance information, such as a progress direction, as an image and/or a voice/sound at a position before a specific guidance point, such as a branch on the guidance route, for guiding the subject vehicle along the route toward the destination.

When the subject vehicle travels an area other than an existing road that is registered in the map data or the learned road, which is already registered, the navigation apparatus 1 of the present embodiment generates, by using a road learning function, new learned road data based on a trace of movements during such a travel, and registers the new learned road data in the memory medium of the map data input unit 24 as the learned road data. The control unit 29 reads the learned road data registered in the memory medium and the road data existing in the map data, and performs a process for maintaining the consistency between the two data to be utilized as one map data, and utilizes the data (i.e., one map data) for the map display process and for the route guidance process.

Specifically, the control unit 29 regularly identifies a current position of the subject vehicle by the position detector 21 during the travel of the subject vehicle. The control unit 29 generates the learned road data based on a trace of vehicle movements from a point where the subject vehicle departs from a range of the existing roads in the map data or a range of the already-registered learned road to a point where the subject vehicle returns to the existing road or to the already-registered learned road. Then, the control unit 29 stores the learned road data generated to the memory medium. The learned road data includes information about the nodes including a connection point node that is a node representing a connection point of the learned road to the existing road (i.e., a departure point, a return point) and connecting links of such nodes, as well as the connection state of the roads that are represented by the links and collection of coordinates of the points that represent a road shape between the departure point and the return point.

First Embodiment

Figure 2:
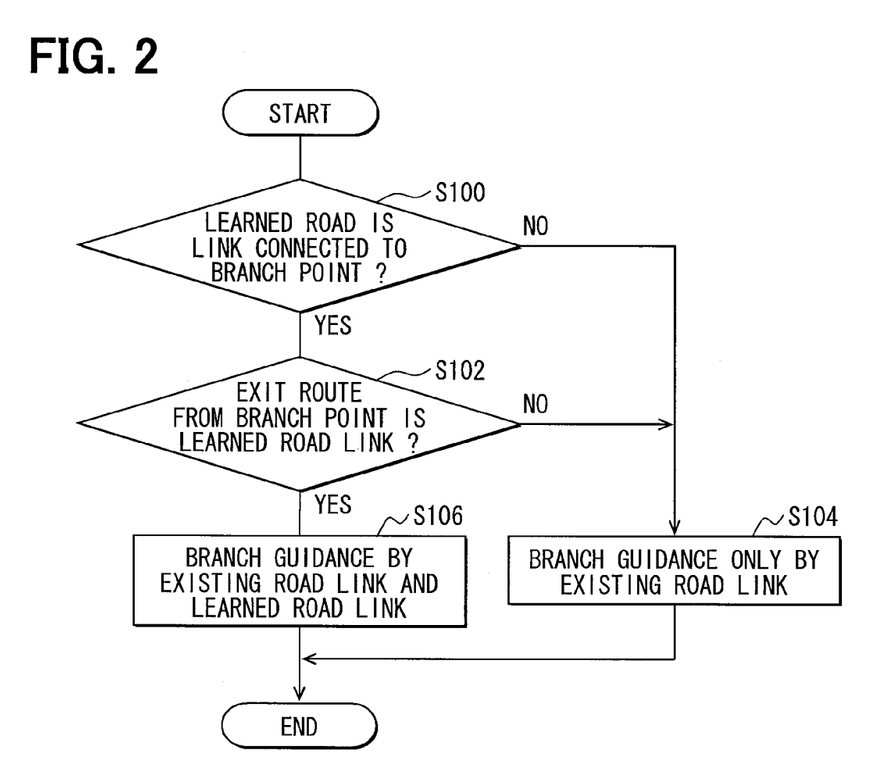
FIG. 2 is a flowchart of a branch guidance control process in the first embodiment.

The control unit 29 performs a branch guidance control process provided in FIG. 2. The branch guidance control process begins during the execution of the route guidance process when the vehicle approaches a branch point located along the guidance route, where the guidance route proceeds through the branch point towards an exit route. The branch guidance control process may begin when, for example, the vehicle reaches a predetermined distance from the branch point that requires route guidance, such as a rotary, a junction.

Per the branch guidance control process, the control unit 29, in S100, determines whether a branch point has the learned road link connected thereto, based on the learned road data including a guidance-object branch point. When the learned road link is connected to the branch point (S100: YES), the process proceeds to S102. When the learned road link is not connected to the branch point (S100: NO), the process proceeds to S104.

In S104, which is subsequent to the determination that the learned road link is not connected to the branch point (S100: NO), the process performs a branch direction determination process by using existing road links only (i.e., "branch guidance only by existing road link" in FIG. 2). Based on the connection direction of each existing road link connected to the branch point, a progress direction of the exit route from the branch point (i.e., a guidance route from the branch point) is determined, and the progress direction is provided by, for example, voice and/or image.

On the other hand, in S102, which is subsequent to a determination that the learned road link is connected to the branch point, the process determines whether the exit route from the branch point is the learned road link. When the exit route from the branch point is not the learned road link (S102: NO), the process proceeds to S104. When the exit route from the branch point is the learned road link (S102: YES), the process proceeds to S106.

In S104, which is subsequent to a determination that the exit route from the branch point is not the learned road link, the learned road link connected to the branch point is ignored, and the branch direction determination process uses the existing road links only in determining the progress direction of the vehicle. Specifically, from among the existing road links and the learned road links connected to the branch point, only the connection direction of the existing road links are considered for determining the progress direction of the exit route from the branch point. The guidance of the progress direction is provided based on the determination result by, for example, sound and/or image. Such progress direction guidance is illustrated in FIG. 3A.

Figure 3A:
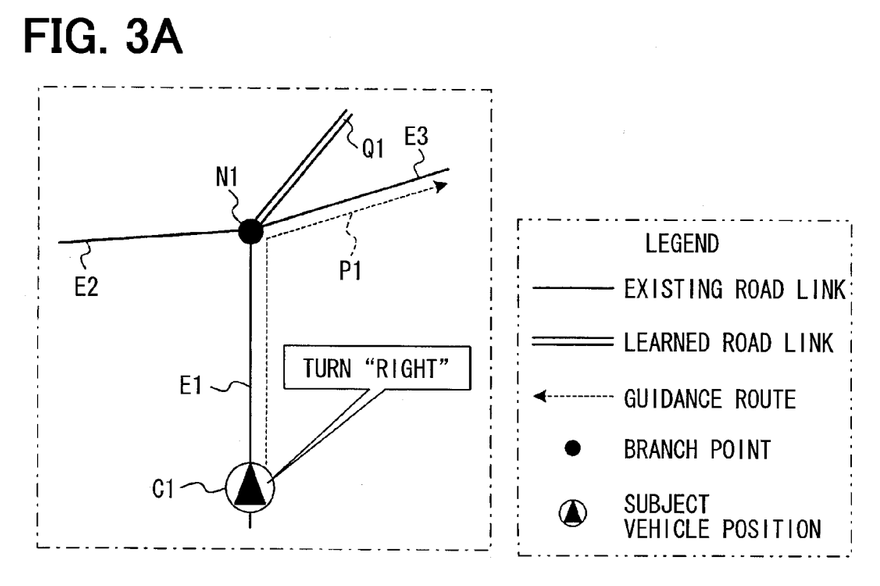
FIGS. 3A and 3B are illustrations of a progress direction guidance at a branch point per the branch guidance control process of FIG. 2.

In the example of FIG. 3A, a guidance route P1 for a subject vehicle passes an existing road link E1 and exits to an existing road link E3 via a branch point N1, where the position of the subject vehicle is provided as C1. The branch point N1 has, in connection thereto, the existing road link E3, which is the exit route from the branch point N1, and a learned road link Q1 and an existing road link E2, both of which are not the exit route. The existing road link E3 and the learned road link Q1 extend on a right turn side relative to a connection direction of the existing road link E1, which serves as an entrance route leading to the branch point N1.

From a viewpoint on the existing road link E1 side, the learned road link Q1 is "far-right," and the existing road link E3 is "near-right." In this case, based on a condition that the exit route from the branch point corresponds to the existing road link, the progress direction of the exit route is provided without considering the existence of the learned road link Q1. That is, without regard to the positioning that the learned road link Q1 is "far-right" and the existing road link E3 is "near-right," by ignoring the learned road link Q1, the progress direction toward the exit route, which is the existing road link E3, is provided simply as "right." Note that the "right" turn case described above may be simply reversed for a "left" turn case, and such reversing may also be applicable for the following embodiments.

With continuing reference to FIG. 2, in S106, which is subsequent to a determination that the exit route from the branch point is the learned road link, a branch direction determination process by using both of the existing road links and the learned road links is performed (i.e., "branch guidance by existing road link and learned road link" in FIG. 2). In this case, based on the connection direction of each of the existing road links and the learned road links, the progress direction of the exit route from the branch point is determined, and the guidance of the progress direction is provided by, for example, voice/image output. Such progress direction guidance is illustrated in FIG. 3B.

Figure 3B:
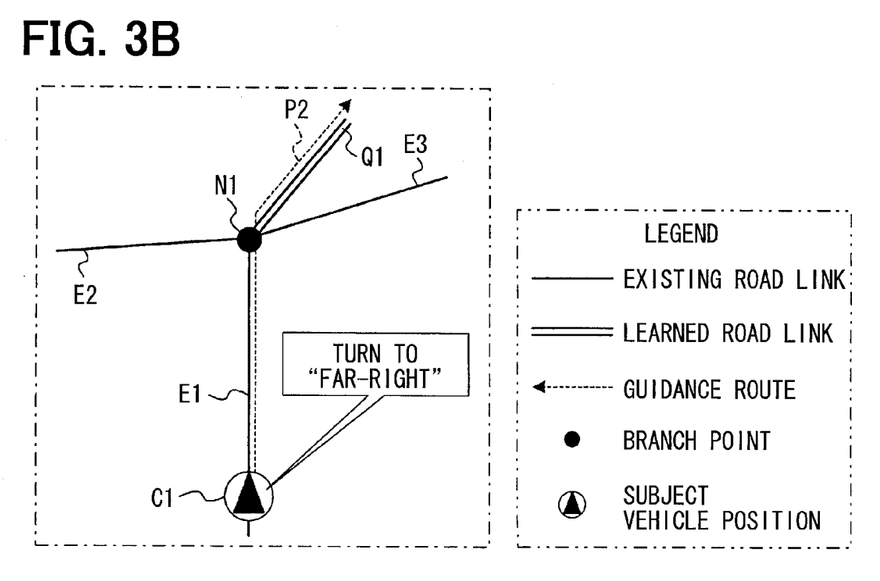

In the example of FIG. 3B, a guidance route P2 passes an existing road link E1, and exits to the learned road link Q1 via the branch point N1. The branch point N1 is connected to the learned road link Q1, which is the exit route of the guidance route P2 from the branch point N1, and the existing road links E3, E2 which are not the exit route. The existing road link E3 and the learned road link Q1 respectively extend on a right turn side relative to a connection direction of the existing road link E1, which serves as the entrance route leading to the branch point N1.

From a viewpoint on the existing road link E1 side, the learned road link Q1 is "far-right," and the existing road link E3 is "near-right." In this case, based on a condition that the exit route from the branch point corresponds to the learned road link, the progress direction of the exit route is provided in a manner that reflects the positioning of the learned road link Q1 and the existing road link E3. That is, based on the positioning that the learned road link Q1 is "far-right" and the existing road link E3 is "near-right," the progress direction toward the exit route, which is the learned road link Q1, is provided as "far-right."

Advantageous Effects of the First Embodiment

In the first embodiment, if the learned road link does not correspond to the exit route from the branch point (i.e., a guidance-object branch point), such learned road link will not be included in determining the progress direction, and the route guidance is performed based on the branch shape that reflects the existing road links only. In such manner, the learned roads, such as a ramp road into a site or an entrance road into a parking, which have a lower reliability relative to the existing road links, will not be included in the route guidance. That is, the risk-free route guidance free from the risk of including low-reliability roads in the route guidance is provided.

Second Embodiment

In the first embodiment, whether the exit route from the branch point is the learned road link or not is considered to determine whether the learned road link is reflected in the progress direction of the guidance route at the branch point. The reliability of the learned road link may further be considered as a criterion of such determination. That is, three examples for determining the reliability of the learned road link are described in the following. In addition, where a procedure of the following examples is similar to the first embodiment, an explanation of such similar procedure is omitted from the description, which focuses on the differences between the two embodiments.

First Example

Figure 4:
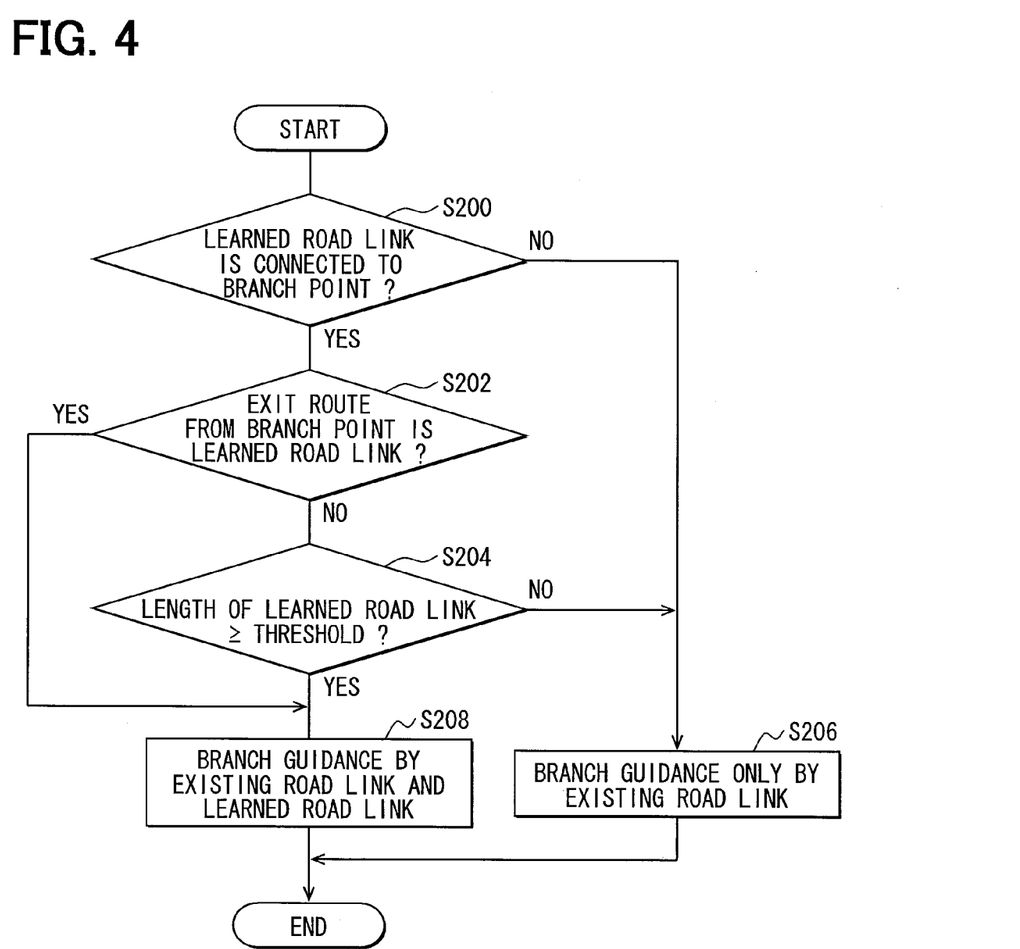
FIG. 4 is a flowchart of a first example of the branch guidance control process in a second embodiment.

The first example in the second embodiment regarding the branch guidance control process performed by the control unit 29 is described with reference to FIG. 4. The procedure of S200 and S202 of FIG. 4 is similar to S100 and S102 of FIG. 2 of the first embodiment, and an explanation of S200 and S202 is omitted.

When the exit route from the branch point is not the learned road link in S202 (S202: NO), the process proceeds to S204. In S204, based on the learned road data, the process determines whether a link length of the learned road link connected to the branch point is greater than or equal to a threshold. In this case, the link length of the learned road link is used as a criterion of the reliability. Specifically, when the link length is greater than or equal to the threshold, the reliability of the learned road link is high and such road link is assumed to be a connection road connected to the branch point. When the link length is smaller than the threshold, the reliability of the learned road link is low and it is assumed that such road link is not a connection road of the branch point.

The reasoning of the above assumption is that a learned road link, which is based on a trace of the vehicle movement along a ramp road into a site (e.g., an entrance road to a parking lot), may not be longer than a learned road link that is based on a trace of the vehicle movement along a public road. Based on such reasoning, when the learned road link connected to the branch point is registered as a road having a sufficient length, such learned road link is assumed to have a high reliability as an actual connection road. In the present embodiment, a threshold value of 30 meters from the branch point is adopted as the reliability criterion. However, the threshold value may be another value or measurement. For example, the threshold value may be based on an overall length of the learned road link, such that the overall length of the learned road link must be greater than or equal to a threshold length.

When the link length of the learned road link connected to the branch point is smaller than the threshold (S204: NO), the process proceeds to S206. When the link length of the learned road link connected to the branch point is greater than or equal to the threshold (S204: YES), the process proceeds to S208.

In S206, which is subsequent to a determination that the link length of the learned road link connected to the branch point is smaller than the threshold, the learned road link connected to the branch point is ignored, the branch direction determination process uses the existing road links only. Such progress direction guidance is illustrated in FIG. 5A.

Figure 5A:
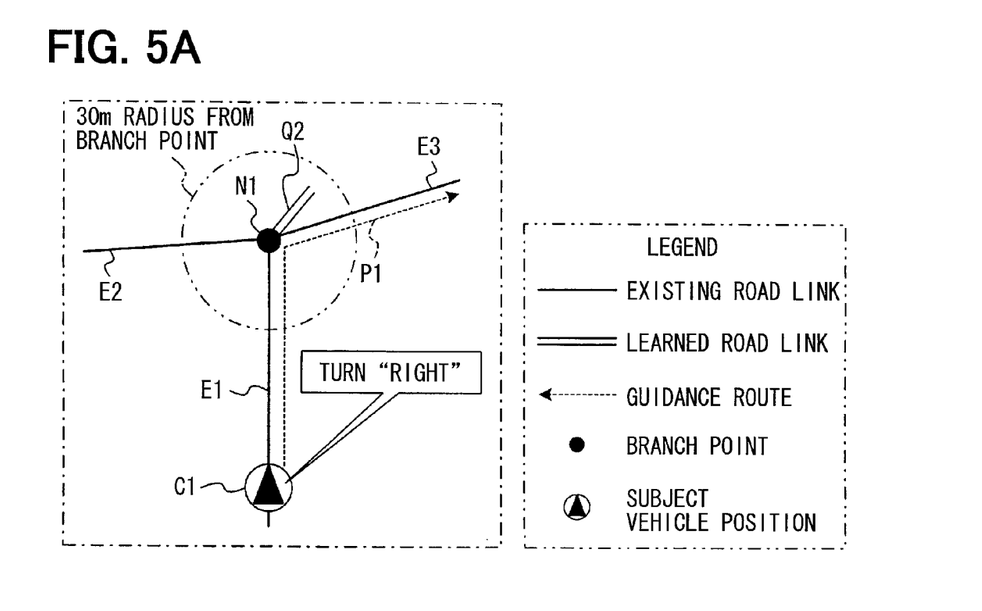
FIGS. 5A and 5B are illustrations of a progress direction guidance at a branch point per the branch guidance control process of FIG. 4.

In the example of FIG. 5A, a guidance route P1, from that subject vehicle position C1, passes an existing road link E1 and exits to an existing road link E3 via a branch point N1. This branch point N1 has, in connection thereto, the existing road link E3, which is an exit route, and a learned road link Q1 and an existing road link E2, both of which are not the exit route. The existing road link E3 and the learned road link Q1 extend on a right turn side relative to a connection direction of the existing road link E1, which serves as an entrance route leading to the branch point N1. Further, from a viewpoint on the existing road link E1 side, the learned road link Q2 is "far-right," and the existing road link E3 is "near-right." However, the learned road link Q2 is contained within a circle of 30 meter radius from the branch point.

Accordingly, based on a condition that (i) the exit route from the branch point N1 corresponds to the existing road link E3 and (ii) the link length of the learned road link Q2 is under 30 meters from the branch point N1, the progress direction of the exit route is provided without considering the existence of the learned road link Q2. Specifically, the position of the learned road link Q2 may be provided as "far-right" and the position of the existing road link E3 may be provided as "near-right". However, by ignoring the learned road link Q2, the progress direction toward the exit route, which is the existing road link E3, is provided as "right", and not as "near-right".

With continuing reference to FIG. 4, in S208, which is subsequent to a determination that the link length of the learned road link greater than or equal to the threshold, a branch direction determination process is performed by using both of the existing road link and the learned road link. Such progress direction guidance is illustrated in FIG. 5B.

Figure 5B:
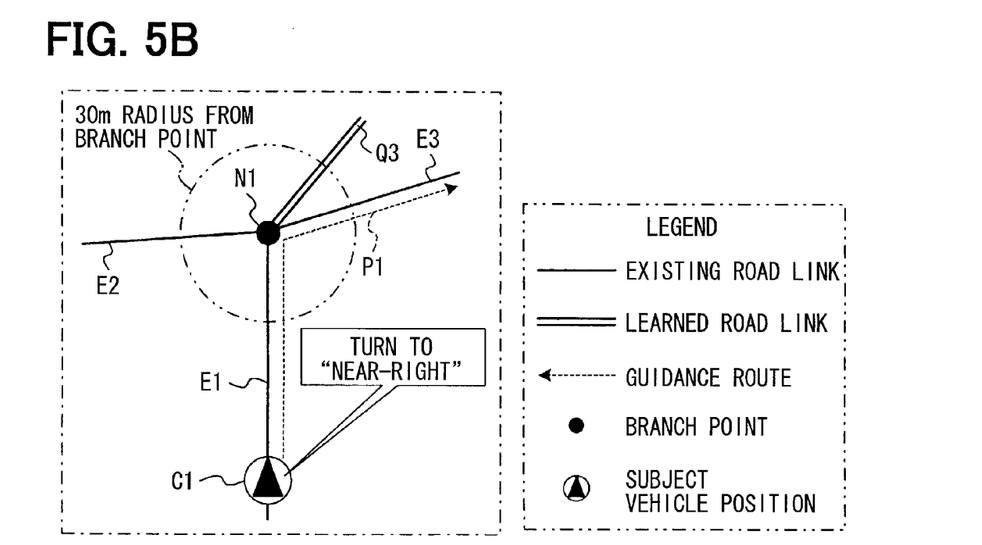

In the example of FIG. 5B, the guidance route P1 is same as the example of FIG. 5A. At the branch point N1, the existing road link E3, which is an exit route of the guidance route P1, and the learned road link Q3, which is not an exit route of the guidance route P1, are respectively connect to the branch point node N1 on a right turn side relative to the connection direction of the existing road link E1, which serves as an entrance route to the branch point node N1. However, the learned road link Q3 extends beyond a circle of 30 meter radius from the branch point. Further, from a viewpoint on the existing road link E1 side, the learned road link Q3 is "far-right," and the existing road link E3 is "near-right."

In this case, even when the exit route of the guidance route P1 from the branch point N1 is not the learned road link Q3, based on a condition that the link length of the learned road link Q3 is equal to or greater than a radius of 30 meters from the branch point N1, the progress direction of the exit route is provided by considering the positional relationship of both of the learned road link Q3 and the existing road link E3 (i.e., the exit route). That is, based on the positioning that the learned road link Q3 is "far-right" and the existing road link E3 is "near-right", the progress direction of the exit route, the existing road link E3, is provided as "near-right."

Second Example

Figure 6:
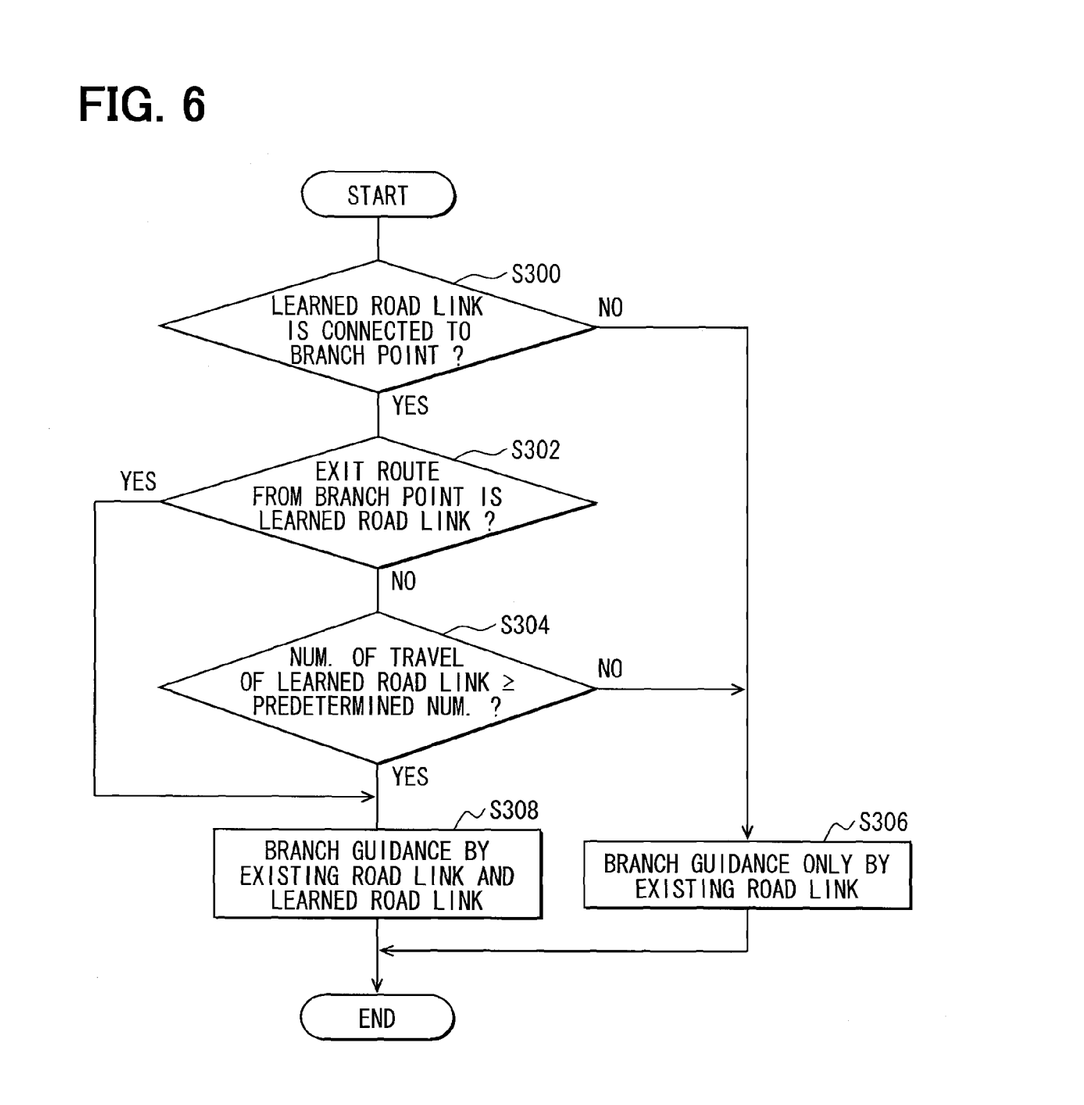
FIG. 6 is a flowchart of a second example of the branch guidance control process in the second embodiment.

The second example of the second embodiment regarding the branch guidance control process performed by the control unit 29 is described with reference to FIG. 6. The procedure of S300 and S302 of FIG. 6 is similar to S100 and S102 of FIG. 2 of the first embodiment.

When the exit route from the branch point is not the learned road link in (S302: NO), the process proceeds to S304. In S304, based on the learned road data, whether the number of travels of the learned road link connected to the branch point is greater than or equal to a predetermined number (e.g., three times) is determined. In this case, the number of travels of the learned road link is used as a criterion of the reliability. That is, when the number of travels of the learned road link is greater than or equal to the predetermined number, the reliability of the learned road link is high and such road link is assumed to be a connection road connected to the branch point. When the number of travels of the learned road link is less than the predetermined number, the reliability of the learned road link is low and such road link is assumed not to be the connection road of the branch point.

The reasoning of the above assumption is that the learned road link based on the trace of the vehicle movement in non-public road areas, such as a ramp road into a site or an entrance road into a parking may not be traveled often. Therefore, when the learned road link is used many times, such road link is assumed to have a high reliability as an actual connection road.

Further, for example, the predetermined number of travels such as three times in the present embodiment may be changed to a different number. When the number of travels of the learned road link connected to the branch point is smaller than the predetermined number (S304: NO), the process proceeds to S306. When the number of travels of the learned road link connected to the branch point is greater than or equal to the predetermined number (S304: YES), the process proceeds to S308.

In S306, which is subsequent to a determination that the number of travels of the learned road link is less than the predetermined number, the branch direction determination process uses the existing road links only, ignoring the learned road link connected to the branch point. Such progress direction guidance is illustrated in FIG. 7A.

Figure 7A:
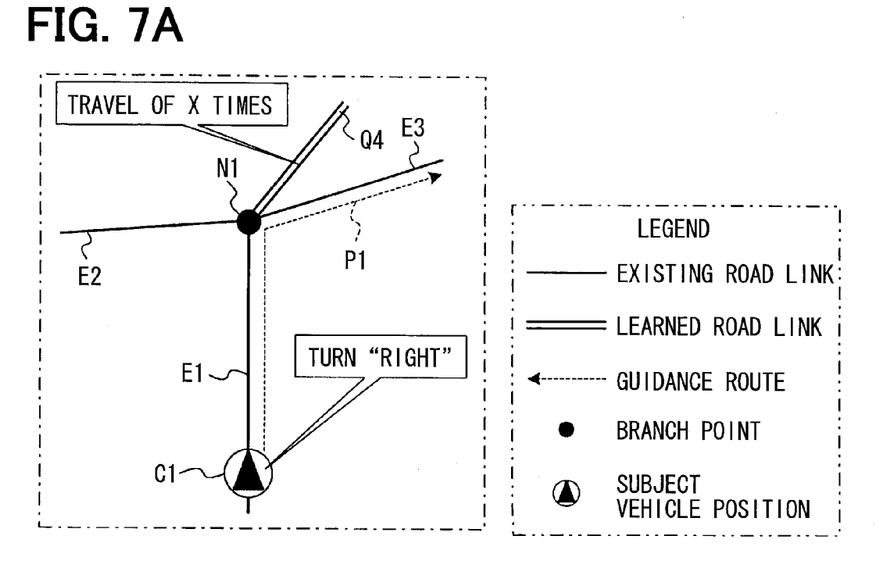
FIGS. 7A and 7B are illustrations of a progress direction guidance at a branch point per the branch guidance control process of FIG. 6.

In the example of FIG. 7A, a guidance route P1, from a subject vehicle position C1, passes an existing road link E1 and exits to an existing road link E3 via a branch point N1. This branch point N1 has, in connection thereto, the existing road link E3, which is the exit route, and a learned road link Q1 and a existing road link E2, both of which are not the exit route. The existing road link E3 and the learned road link Q1 extend on a right turn side relative to a connection direction of the existing road link E1, which serves as an entrance route leading to the branch point N1. Further, from a viewpoint on the existing road link E1, the learned road link Q4 is "far-right," and the existing road link E3 is "near-right." In addition, the number of travels accumulated by the learned road link Q4 is X times, which is smaller than a predetermined number R.

In this case, based on a condition that (i) the exit route from the branch point N1 corresponds to an existing road link and (ii) X the number of travels of the learned road link Q4 is smaller than R, the progress direction of the exit route is provided without considering the existence of the learned road link Q4. That is, without regard to the position of the learned road link Q4 as "far-right" and the existing road link E3 as "near-right," the learned road link Q4 is ignored and the progress direction toward the exit route of the guidance route P1, which is the existing road link E3, is provided as "right."

With continuing reference to FIG. 6, in S308, which is subsequent to a determination that the number of travels of the learned road link connected to the branch point is greater than or equal to the predetermined number, the branch direction determination process uses both of the existing road links and the learned road links for the determination of the branch direction. Such progress direction guidance is illustrated in FIG. 7B.

Figure 7B:
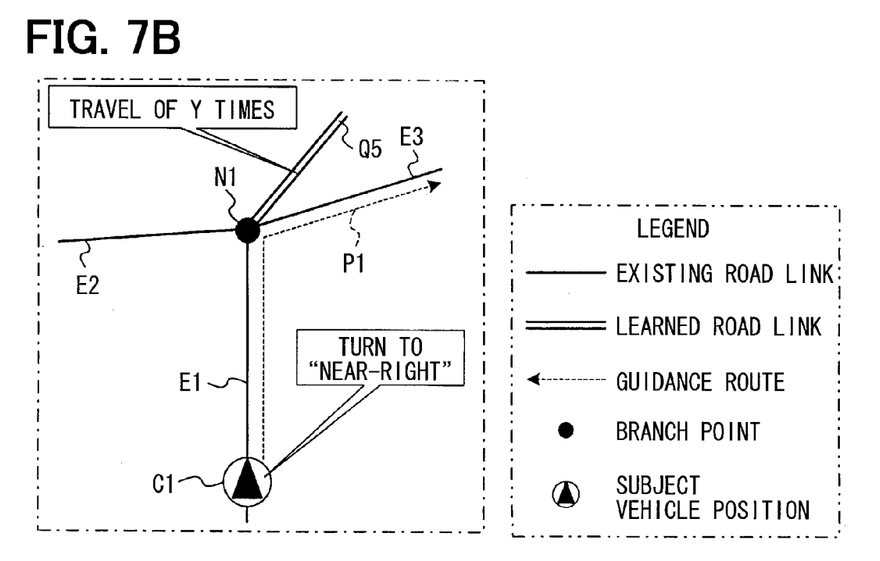

In the example of FIG. 7B, the guidance route P1 is same as the example of FIG. 7A. At the branch point N1, the existing road link E3, which is an exit route, and a learned road link Q5, which is not an exit route, are respectively connect to the branch point N1 on a right turn side relative to the connection direction of the existing road link E1, which serves as an entrance route to the branch point N1. Further, the number of travels of the learned road link Q5 is Y times, which is greater than or equal to the predetermined number R. Further, from a viewpoint on the existing road link E1, the learned road link Q5 is "far-right" and the existing road link E3 is "near-right."

In this case, even when an exit route of the guidance route from the branch point is not the learned road link, based on a condition that the number of travels of the learned road link Q5 is equal to or greater than the predetermined number R, the progress direction of the exit route is provided by considering the positional relationship of both of the learned road link Q5 and the existing road link E3. That is, based on the positioning that the learned road link Q5 is "far-right" and the existing road link E3 is "near-right", the progress direction of the exit route, which is the existing road link E3, is provided as "near-right."

Third Example

Figure 8:
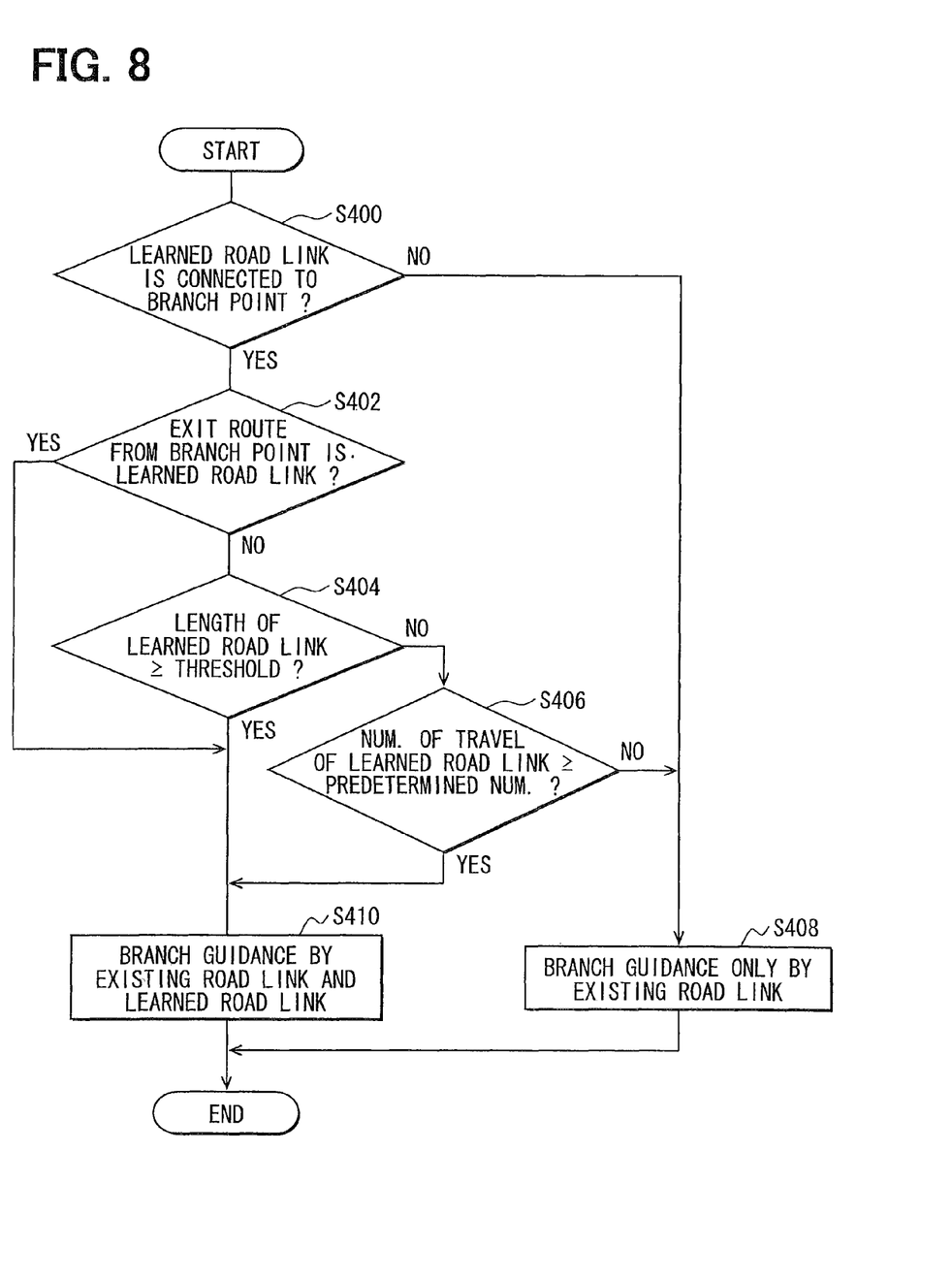
FIG. 8 is a flowchart of a third example of the branch guidance control process in the second embodiment.

The third example in the second embodiment regarding the branch guidance control process performed by the control unit 29 is described with reference to a flowchart in FIG. 8. The procedure of S400 and S402 of FIG. 8 is similar to S100 and S102 of FIG. 2 of the first embodiment.

When the exit route from the branch point is not the learned road link (S402: NO), the process proceeds to S404. In S404, based on the learned road data, the process determines whether a link length of the learned road link connected to the branch point is greater than or equal to a threshold. When the link length of the learned road link is greater than or equal to the threshold, such learned road link is assumed as a connection road to the branch point. If the link length of the learned road link is less than the threshold, such learned road link is assumed as not being a connection road to the branch point, and the process proceeds to determine the reliability determination based on the number of travels.

When the link length of the learned road link connected to the branch point is less than the threshold (S404: NO), the process proceeds to S406. When the link length of the learned road link connected to the branch point is greater than or equal to the threshold (S404: YES), the process proceeds to S410.

In S406, which is subsequent to a determination that the link length of the learned road link connected to the branch point is less than the threshold, the process determines, based on the learned road data, whether the number of travels of the learned road link connected to the branch point is greater than or equal to a predetermined number (e.g., three times). In this case, when the number of travels of the learned road link is greater than or equal to the predetermined number, such learned road link is assumed as the connection road to the branch point. When the number of travels of the learned road link is less than the predetermined number, such learned road link is assumed as not being the connection road to the branch point.

When the number of travels of the learned road link is less than the predetermined number (S406: NO), the proceeds to S408. When the number of travels of the learned road link is greater than or equal to the predetermined number (S406: YES), the process proceeds to S410.

In S408, which is subsequent to a determination that the number of travels of the learned road link is less than the predetermined number, the process ignores the learned road link connected to the branch point, to perform the branch direction determination process using the existing road links only. In such case, the progress direction guidance is same as the examples of FIG. 5A or FIG. 7A. On the other hand, in S410, the branch direction determination process uses the existing road links and the learned road links in determining the progress direction. In such case, the progress direction guidance is same as the examples of FIG. 5B or FIG. 7B.

Advantageous Effects of the Second Embodiment

If the learned road link connected to the branch point is an actual connection road connected to the branch point and not a ramp road into, for example, a site, or not an entrance road into, for example, a parking, the route guidance reflecting such learned road link becomes more suitable for an actual branch shape of the road, and may be readily understood by the user. Therefore, based on a condition that the learned road connected to the guidance-object branch point fulfills the reliability determination criteria such as the link length and the number of travels, the route guidance is provided based on the branch shape including such learned road link. That is, the risk-free route guidance free from the risk of including low-reliability roads in the route guidance is provided.

Third Embodiment

The second embodiment described above uses the reliability of the learned road link, whether the learned road link is a connection road or not, as a criterion for determining if the learned road link could be included in or reflected to the progress direction guidance at a branch point.

In the third embodiment, the above determination criterion is further supplemented by a criterion that examines a positional relationship between the existing road link serving as the exit route of the guidance route and the learned road link that is not the exit route.

Figure 9:
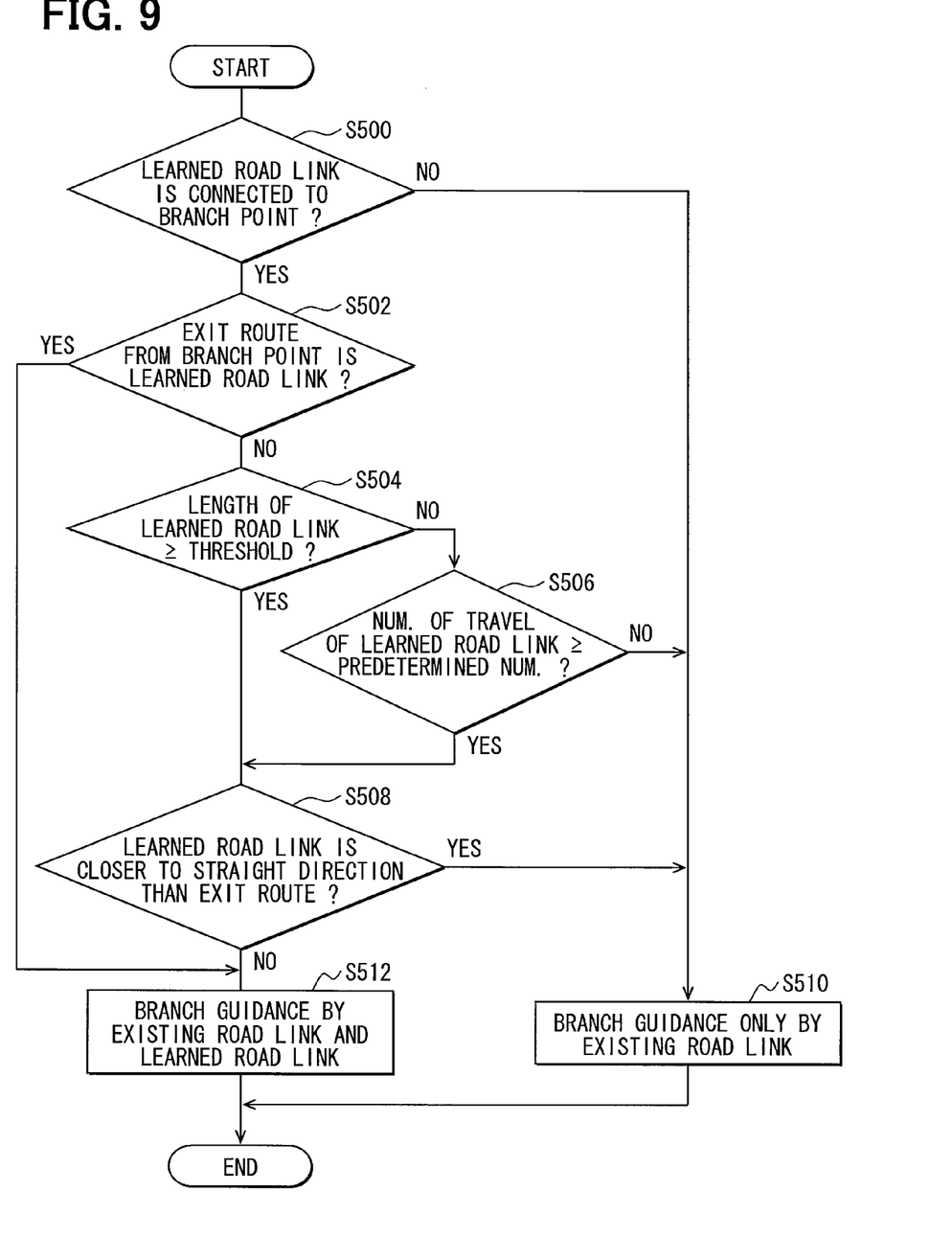
FIG. 9 is a flowchart of the branch guidance control process in the third embodiment.

The branch guidance control process that is performed by the control unit 29 is described with reference to FIG. 9. The procedure in S500 to S506 of FIG. 9 is similar to the procedure of S400 and S406 of FIG. 8 in the third example of the second embodiment. Therefore, an explanation of S500 to S506 is omitted.

When the link length of the learned road link is determined to be greater than or equal to the threshold (S504: YES), or when the number of travels of the learned road link is determined to be greater than or equal to the predetermined number (S506: YES), the process proceeds to S508. In S508, the process determines whether the learned road link is positioned closer to a straight travel direction than the existing road link, which is the exit route of the guidance route. The straight travel direction in this case means a direction that is identical to an entrance direction for entering the branch point. In other words, if the subject vehicle is assumed to travel straight through the branch point from the entrance route, such travel of the subject vehicle along the entrance route points to the straight travel direction.

Further, the positioning of the learned road link being closer to a straight travel direction than the existing road link, which is the exit route, means that an angle between the learned road link and the straight direction is smaller than an angle between the exit route and the straight direction. In other words, a connection angle of the learned road link relative to the straight direction is smaller than a connection angle of the exit route relative to the straight direction.

When the learned road link is positioned closer to the straight direction than the existing road link of the exit route (S508: YES), the process proceeds to S510. When the existing road link of the exit route is positioned closer to the straight direction than the learned road link (S508: NO), the process proceeds to S512.

In S510, which is subsequent to a determination that the learned road link is positioned closer to the straight direction than the existing road link of the exit route, the branch direction determination process uses the existing road links only, ignoring the learned road links connected to the branch point. Such progress direction guidance is illustrated in FIG. 10A.

Figure 10A:
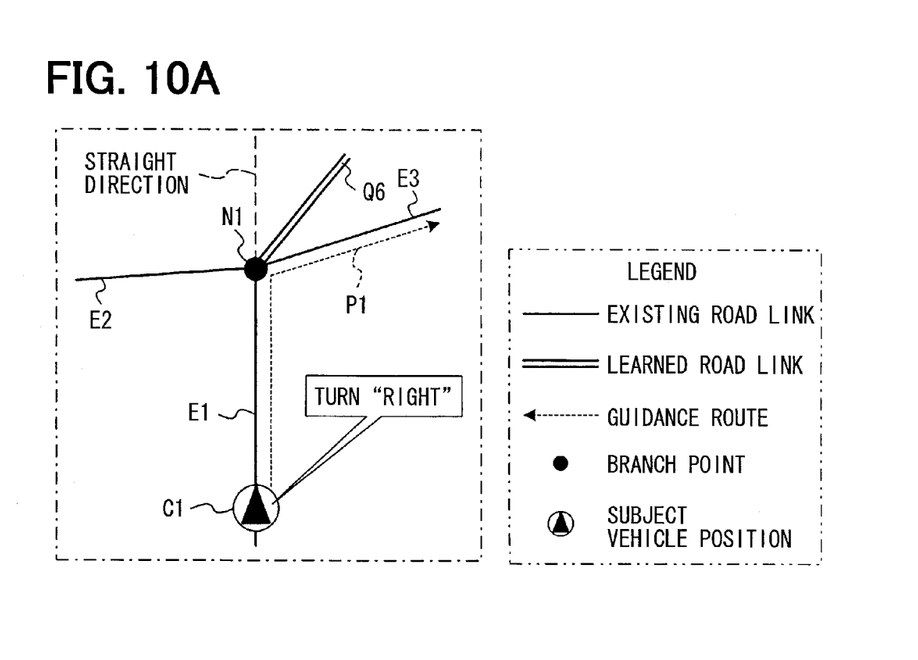
FIGS. 10A and 10B are illustrations of a progress direction guidance at a branch point per the branch guidance control process of FIG. 9.

In the example of FIG. 10A, a guidance route P1 from a subject vehicle position C1, passes an existing road link E1, and exits to an existing road link E3 via a branch point node N1. The branch point N1 has, in connection thereto, the existing road link E3, which is an exit route, and a learned road link Q6 and an existing road link E2, both of which are not the exit route. The existing road link E3 and the learned road link Q6 extend on a right turn side relative to a connection direction of the existing road link E1, which serves as an entrance route leading to the branch point N1. In this case, however, the learned road link Q6 is positioned closer to the straight direction than the existing road link E3 of the exit route. In other words, from an entrance route viewpoint on the existing road link E1 side, the learned road link Q6 is "far-right," and the existing road link E3 is "near-right."

The learned road link Q6 in this case fulfills the reliability condition based on the link length or based on the number of travels. Therefore, based further on the fulfillment of a condition that this learned road link Q6 is positioned closer to the straight direction than the existing road link E3, without considering the existence of the learned road link Q6, the progress direction of the exit route is provided. That is, by ignoring the learned road link Q6, which has the positioning as "far-right" and the existing road link E3 as "near-right," the progress direction toward the exit route, which is the existing road link E3, is provided as "right."

In this case, the user can readily understand a correct exit route that is positioned at the nearest-right (i.e., the existing road link E3) even when the progress direction is simply provided as "right" by ignoring the learned road link Q6, because the user tends to firstly recognize the nearest-right road relative to the user upon receiving the "right" direction instruction. In such manner of providing the guidance, possible confusion due to two similar directions decreases. Therefore, even when the learned road link fulfills the reliability condition, for the avoidance of running a risk of providing the route guidance in consideration of a less-reliable learned road link, which is less reliable than the existing road link, the progress direction at the branch point is provided by ignoring the learned road link.

With continuing reference to FIG. 9, in S512, which is subsequent to a determination that the existing road link of the exit route is positioned closer to the straight direction than the learned road link, the branch direction determination process uses the existing road links and the learned road links for determining the progress direction of the guidance route. Such progress direction guidance is illustrated in FIG. 10B.

Figure 10B:
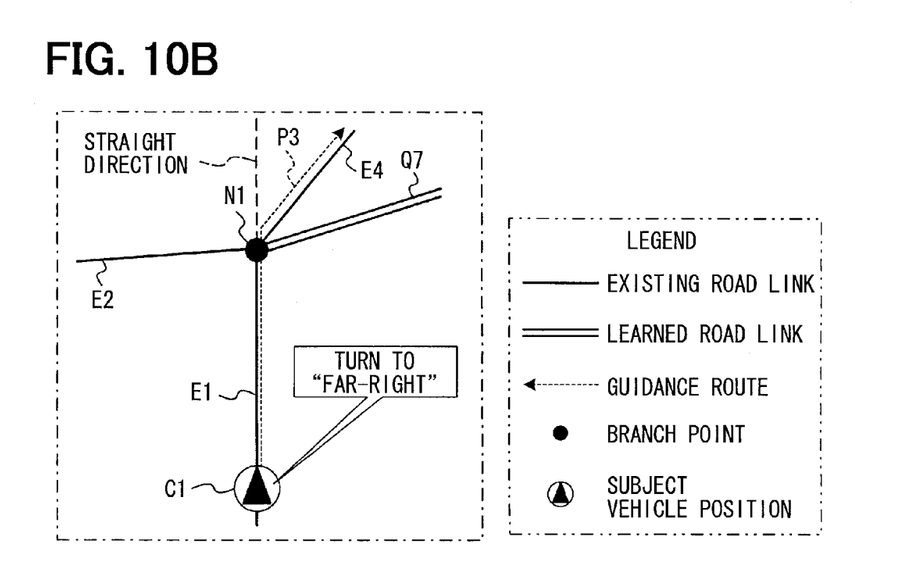

In the example of FIG. 10B, a guidance route P3 from a subject vehicle position C1, passes an existing road link E1, and exits to an existing road link E4 via a branch point N1. This branch point N1 has, in connection thereto, the existing road link E4, which is the exit route, and a learned road link Q7 and a existing road link E2, none of which are the exit route. The learned road link Q7 and the existing road link E4 extend on a right turn side relative to a connection direction of the existing road link E1, which serves as an entrance route leading to the branch point N1. However, the existing road link E3 is positioned closer to the straight direction than the learned road link Q7. In other words, from the view point of the entrance route (i.e., the existing road link E1), the learned road link Q7 is "near-right" and the existing road link E4 is "far-right."

The learned road link Q7 in this case fulfills the reliability condition based on the link length or based on the number of travels. Therefore, based further on the fulfillment of a condition that the existing road link E4 of the exit route is positioned closer to the straight direction than this learned road link Q7, the progress direction of the exit route is provided in a manner that considers the positional relationship of the learned road link Q7 and the existing road link E4. In other words, based on the positional relationship that the learned road link Q7 is "near-right" and the existing road link E4 is "far-right," the progress direction toward the exit route of the guidance route P3, which is the existing road link E4, is provided as "far-right."

In this case, if the route guidance for the user is simply provided as "right," the user may be confused whether a correct road to be traveled after the "right" turn is the learned road link Q7 in the "near-right" direction or the existing road link E4 in the "far-right" direction, relative to the branch point N1. This is because it may be difficult for the user to recognize a "far-right" side road when the route guidance for the user is simply provided as "right." Therefore, in this case, the route guidance for the user is provided as the progress direction that considers the existing road link and the learned road link without ignoring the learned road link.

Advantageous Effects of the Third Embodiment

Whether to reflect the learned road link to the route guidance may be determined based on a condition of the positional relationship between the exit route and the learned road link of a branch point, in addition to a condition whether the learned road link connected to the branch point fulfills the reliability condition of the connection road. In this case, the determination criterion is that which one of the learned road link and the existing road link of the exit route is positioned closer to the straight direction from a viewpoint on an entrance route side at the branch point. The reason for using such determination criterion is that the positional relationship of the two links, "far-right" and "near-right," makes it less possible for the user to misunderstand the progress direction of the exit route. That is, by using such determination criterion, a user friendly route guidance for guiding an exit route from a branch point is enabled.

Based on the various embodiments, a branch guidance by only existing road link may be referred to a first mode and a branch guidance by existing road link and learned road link may be referred to as a second mode in the claims.

In addition, the navigation apparatus may be provided as including an exit route determination unit and a route guidance unit. The exit route determination unit may determine whether an exit route from a branch point at the route guidance corresponds to a learned road link, and the route guidance unit may provide a route guidance by presenting a progress direction of the exit route from the branch point in a first mode or a second mode. Per the first mode, the progress direction is provided in a manner that includes the existing road link, and per the second mode the progress direction is provided in a manner that includes the learned road link and the existing road link. The first mode may be provided when the exit route determination unit determines that the exit route from the branch point does not correspond to the learned road link. The second mode may be provided when the exit route determination unit determines that the exit route from the branch point corresponds to the learned road link.

In addition, the navigation apparatus may include a reliability determination unit that determines whether the learned road link connected to the branch point fulfills a predetermined reliability condition to be serving as a connection road of the branch point. Accordingly, the route guidance unit provides the progress direction in the first mode, when the exit route from the branch point does not correspond to the learned road link, as determined by the exit route determination unit, and the learned road link does not fulfill the reliability condition, as determined by the reliability determination unit.

On the other hand, the route guidance unit provides the progress direction in the second mode, when the exit route determination unit determines that the exit route from the branch point corresponds to the learned road link or when the reliability determination unit determines that the learned road link fulfills the reliability condition.

If the learned road link represents an actual connection road of the branch point and is not derived from the ramp road into the site or the entrance road into the parking, inclusion of the learned road link in the branch shape that will be reflected to the route guidance makes the route guidance more fitting to the actual branch shape, making the guidance more understandable for the user. Therefore, when a learned road connected to the branch point that is an object of the route guidance fulfills the reliability condition to be highly possibly serving as the actual connection road, the route guidance may reflect the branch shape that includes such learned road link.

Further, an example of a reliability condition of the reliability determination unit may be a length of the link road. Specifically, the reliability determination unit may determine whether the length of the learned road link connected to the branch point is greater than or equal to a preset value/threshold. Accordingly, the route guidance unit provides the progress direction in the first mode, when the exit route determination unit determines that the exit route from the branch point does not correspond to the learned road link and the reliability determination unit determines that the link length of the learned road link is shorter than the preset value. On the other hand, when (a) the exit route determination unit determines that the exit route from the branch point corresponds to the learned road link, or (b) the reliability determination unit determines that the link length of the learned road link is one of equal to and longer than the preset value, the route guidance unit provides the progress direction in the second mode.

In general, the learned road link based on the trace of the vehicle movements in a non-public road area that is not a public road, such as the ramp road or the parking, may hardly be longer than the learned road link based on the trace of the vehicle movements on the actual public road. In other words, when the learned road link connected to the branch point is registered as a road having a sufficient link length, such learned road link is considered to have a high reliability as an actual connection road of the branch point. Therefore, using the link length of the learned road link as a determination criterion of the reliability is effective and reasonable.

Alternatively, the reliability determination unit may use the number of travels of the learned road link as the reliability condition. Specifically, the reliability determination unit may determine whether the number of times the learned road link, which is connected to a branch point, was traveled is greater than or equal to a preset value. Accordingly, the route guidance unit provides the progress direction in the first mode, when the exit route determination unit determines that the exit route from the branch point does not correspond to the learned road link and the reliability determination unit determines that the number of travels of the learned road link is less than the preset value. On the other hand, when (a) the exit route determination unit determines that the exit route from the branch point corresponds to the learned road link, or (b) the reliability determination unit determines that the number of travels of the learned road link is greater than or equal to the preset value, the route guidance unit provides the progress direction in the second mode.

In general, the learned road link generated based on the trace of vehicle movements, which is not on the public road, may hardly be traveled on. In other words, when a learned road link connected to the branch point is used many times, such learned road link has, as the actual connection road, a high reliability. Therefore, using the number of travels of the learned road link as a reliability condition is effective and reasonable. The number of travels of a road link may be counted and accumulated as data that is associated with the learned road data of such learned road link whenever a vehicle travels such learned road link, for the later use of such number as the reliability determination criterion.

A combination of the link length of the learned road link and the number of travels of the learned road link may also be used as the reliability condition. Specifically, the reliability determination unit may determine, as the reliability condition, whether the link length of the learned road link connected to the branch point is greater than or equal to a preset length threshold and whether the number of travels of the learned road link connected to the branch point is greater than or equal to a preset value.

Accordingly, the route guidance unit provides the progress direction in the first mode when (i) the exit route determination unit determines that the exit route from the branch point does not correspond to the learned road link and (ii) the reliability determination unit determines that (a) the link length of the learned road link is shorter than the preset length threshold and (b) the number of travels of the learned road link is less than the preset value.

On the other hand, the route guidance unit provides the progress direction in the second mode, when (i) the exit route determination unit determines that the exit route from the branch point corresponds to the learned road link, or (ii) the reliability determination unit determines one of (a) the link length of the learned road link is greater than or equal to the preset length threshold and (b) the number of travels of the learned road link is greater than or equal to the preset value.

The navigation apparatus may further include a positional relationship determination unit. The positional relationship determination unit may determine whether a positional relationship between (a) the learned road link, which is connected to the branch point, and (b) the existing road link, which is the exit route from the branch point, fulfills a predetermined positional condition regarding the progress direction at the branch. Accordingly, the route guidance unit provides the progress direction in the first mode, when the positional relationship determination unit determines the fulfillment of the predetermined positional condition, under a condition that the reliability determination unit determines that the learned road link fulfills the reliability condition. On the other hand, the route guidance unit provides the progress direction in the second mode when the positional relationship determination unit determines no fulfillment of the predetermined positional condition.

In such a configuration, the positional relationship between the learned road link connected to the branch point and the existing road link of the exit route from the branch point is also considered in order to determine whether the route guidance should be based on the branch shape that includes the learned road link reflected thereto. In this case, a predetermined positional condition regarding the progress direction at the branch may be, for example, a positional relationship, between the existing road link and the learned road link is less likely or not to induce a user's erroneous recognition of the progress direction of the exit route from the branch point.

For instance, the positional relationship determination unit may determine, as a predetermined positional condition, whether the learned road link is positioned closer to a straight direction that passes the branch point straight than the existing road link. Accordingly, under a condition that the reliability determination unit determines that the learned road link fulfills the reliability condition, if the positional relationship determination unit determines that the learned road link is positioned closer to the straight direction than the existing road link, the route guidance unit provides the progress direction in the first mode.

On the other hand, if the positional relationship determination unit determines that the existing road link, which is the exit route from the branch point, is positioned closer to the straight direction than the learned road link, the route guidance unit provides the progress direction in the second mode.

The above configuration determines whether to reflect the learned road link to the guidance of the progress direction at the branch point according to the positional relationship of the learned road link and the existing road link relative to entrance route side of the branch point.

For example, when the user is provided with a certain progress direction, whether such a progress direction of the road is on the user's nearest side or not affects the ease of recognition of the provided progress direction by the user. That is, the user tends to first recognize the nearest side road, and to later recognize the far side road. Therefore, the exit route to be provided for the user is on the near side of the learned road link from a viewpoint of the user traveling along the entrance route towards the branch point, the user's may correctly recognize the exit route. Thus, even when the learned road link fulfills the reliability condition, the progress direction is provided by ignoring the learned road link, to avoid confusing the user.

Conversely, when the learned road link having a low reliability is positioned on the near side of the user, i.e., from a viewpoint on the entrance route side, the route guidance of the exit route is made more readily understandable for the user by providing the progress direction toward the exit route with a clear distinction between the position of the existing road link and the position of the learned road link, that is, by not ignoring the learning road link.

Although the present disclosure has been fully described in connection with the preferred embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A navigation apparatus providing route guidance of a travel of a vehicle by utilizing (i) ready-made map data and (ii) learned road data, the apparatus comprising:
   an exit route determination unit configured to determine whether an exit route of a route guidance from a branch point corresponds to a learned road link of the learned road data;
   a route guidance unit configured to provide route guidance by presenting a progress direction toward the exit route from the branch point via outputting sound in both a first mode and a second mode, the first mode including an existing road link of the ready-made map data in determining the progress direction, and the second mode including the existing road link and the learned road link in determining the progress direction, wherein, the first mode and the second mode are different
   the route guidance unit is further configured to provide the progress direction of the route guidance in
   (i) the first mode when the exit route determination unit determines that the exit route from the branch point does not correspond to the learned road link, and
   (ii) the second mode when the exit route determination unit determines that the exit route from the branch point corresponds to the learned road link; and
   a reliability determination unit configured to determine whether a learned road link connected to the branch point satisfies a predetermined reliability condition to be serving as a connection road of the branch point, wherein the route guidance unit is further configured to provide the route guidance in (i) the first mode when the exit route determination unit determines that the exit route from the branch point does not correspond to the learned road link and the reliability determination unit determines that the learned road link does not satisfy the reliability condition, and in (ii) the second mode when one of (a) the exit route determination unit determines that the exit route from the branch point corresponds to the learned road link and (b) the reliability determination unit determines that the learned road link fulfills the reliability condition.

2. The navigation apparatus of claim 1, wherein
   the reliability determination unit is further configured to determine, as the reliability condition, whether a link length of the learned road link connected to the branch point is greater than or equal to a preset value, and
   the route guidance unit is further configured to provide the route guidance in (i) the first mode when the exit route determination unit determines that the exit route from the branch point does not correspond to the learned road link and the reliability determination unit determines that the link length of the learned road link is shorter than a preset value, and in (ii) the second mode when one of (a) the exit route determination unit determines that the exit route from the branch point corresponds to the learned road link and (b) the reliability determination unit determines that the link length of the learned road link is greater than or equal to the preset value.

3. The navigation apparatus of claim 1, wherein
   the reliability determination unit is further configured to determine, as the reliability condition, whether a number of travels of the learned road link connected to the branch point is greater than or equal to a preset value, and
   the route guidance unit is further configured to provide the route guidance in the first mode when the exit route determination unit determines that the exit route from the branch point does not correspond to the learned road link and the reliability determination unit determines that the number of travels of the learned road link is less than the preset value and in the second mode when one of (a) the exit route determination unit determines that the exit route from the branch point corresponds to the learned road link and (b) the reliability determination unit determines that the number of travels of the learned road link is greater than or equal to the preset value.

4. The navigation apparatus of claim 1, wherein
   the reliability determination unit is further configured to determine, as the reliability condition, whether a link length of the learned road link connected to the branch point is greater than or equal to a preset length threshold and whether a number of travels of the learned road link connected to the branch point is greater than or equal to a preset value, and
   the route guidance unit is further configured to provide the route guidance in:
   (i) the first mode when (a) the exit route determination unit determines that the exit route from the branch point does not correspond to the learned road link and (b) the reliability determination unit determines that the link length of the learned road link is shorter than the preset length threshold and the number of travels of the learned road link is less than the preset value, and
   (ii) the second mode when one of (a) the exit route determination unit determines that the exit route from the branch point corresponds to the learned road link and (b) the reliability determination unit determines one of the link length of the learned road link is greater than or equal to the preset length threshold and the number of travels of the learned road link is greater than or equal to the preset value.

5. The navigation apparatus of claim 1 further comprising:
   a positional relationship determination unit is configured to determine whether a positional relationship between the learned road link connected to the branch point and the existing road link connected to the branch point fulfills a predetermined positional condition, the existing road link being the exit route of the route guidance and the learned road not being the exit route of the route guidance, wherein the route guidance unit is further configured to provide the route guidance in (i) the first mode when the positional relationship determination unit determines the fulfillment of the predetermined positional condition, under a condition that the reliability determination unit determines that the learned road link fulfills the reliability condition and in (ii) the second mode when the positional relationship determination unit determines no fulfillment of the predetermined positional condition.

6. The navigation apparatus of claim 5, wherein the positional relationship determination unit is further configured to determine, as a predetermined positional condition, whether the learned road link is positioned closer to a straight direction that passes through the branch point than the existing road link from the branch point, and the route guidance unit is further configured to provide the route guidance in (i) the first mode when, under a condition that the reliability determination unit determines that the learned road link fulfills the reliability condition, the positional relationship determination unit determines that the learned road link is positioned closer to the straight direction than the existing road link, and in (ii) the second mode when the positional relationship determination unit determines that the existing road link is positioned closer to the straight direction than the learned road link.

7. The navigation apparatus of claim 1, wherein
the outputted sound provides voice guidance regarding the progress direction.

8. The navigation apparatus of claim 1, wherein
the progress direction is output at a position before the branch point.

9. The navigation apparatus of claim 1, wherein
the exit route is an entrance to a parking lot.

10. The navigation apparatus of claim 1, wherein
the exit route is a nonpublic road that does not appear on ready-map made data.

11. The navigation apparatus of claim 1, wherein
the exit route is a previously constructed road that does not appear on ready-made map data.

12. A navigation apparatus for determining a proper exit from a breach point in an intersection that includes public and nonpublic roads comprising:
   a route determination control unit configured to determine a current location and a driving path of a vehicle based on location data, ready-made map data, and recently determined learned road data;
   an exit route determination unit configured to determine whether an exit route on the driving path corresponds to an exit route from a ready-made map data or from learned road data;
   a route guidance unit connected to a speaker configured to present a progress direction via an audible sound before route determination control unit determines that the vehicle has reached a branch point that includes the exit route, the progress direction includes
      a first mode presented via outputting sound when the exit route determination unit determines that the exit route includes an existing road of the ready-made map data only, and
      a second mode presented via outputting sound when the exit route determination unit determines that the exit route includes the existing road and the recently determined learned road data, wherein
   the first mode is different than the second mode; and
   a reliability determination unit configured to determine whether a learned road link connected to the branch point satisfies a predetermined reliability condition to be serving as a connection road of the branch point, wherein
the route guidance unit is further configured to provide the route guidance in (i) the first mode when the exit route determination unit determines that the exit route from the branch point does not correspond to the learned road link and the reliability determination unit determines that the learned road link does not satisfy the reliability condition, and in (ii) the second mode when one of (a) the exit route determination unit determines that the exit route from the branch point corresponds to the learned road link and (b) the reliability determination unit determines that the learned road link fulfills the reliability condition.

13. The navigation apparatus in claim 12, wherein
the exit route is an entrance to a parking lot.

* * * * *